(12) United States Patent
Feng et al.

(10) Patent No.: US 7,834,090 B2
(45) Date of Patent: Nov. 16, 2010

(54) RUBBER COMPOSITION AND VIBRATION DAMPER USING THE RUBBER COMPOSITION

(75) Inventors: Yuding Feng, Rochester Hills, MI (US); Yahya Hodjat, Oxford, MI (US); Lin Zhu, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 364 days.

(21) Appl. No.: 11/890,163

(22) Filed: Aug. 3, 2007

(65) Prior Publication Data

US 2009/0036609 A1 Feb. 5, 2009

(51) Int. Cl.
*F16F 15/08* (2006.01)
*C09K 3/00* (2006.01)
*C08L 23/16* (2006.01)

(52) U.S. Cl. .............................. 525/61; 525/56; 525/57; 525/220; 525/472; 428/494

(58) Field of Classification Search .................... 525/57, 525/56, 220, 61, 472; 428/494
See application file for complete search history.

(56) References Cited

U.S. PATENT DOCUMENTS

| | | | | |
|---|---|---|---|---|
| 2,693,459 A | * | 11/1954 | Fisk | 525/57 |
| 3,830,888 A | * | 8/1974 | King | 525/78 |
| 4,237,176 A | | 12/1980 | Brueggemann et al. | |
| 4,272,572 A | | 6/1981 | Netherly | |
| 4,678,707 A | | 7/1987 | Shinozaki et al. | |
| 4,740,427 A | | 4/1988 | Ochiumi et al. | |
| 4,822,834 A | | 4/1989 | Blevins | |
| 4,899,323 A | * | 2/1990 | Fukahori et al. | 367/176 |
| 5,514,752 A | * | 5/1996 | Gutweiler et al. | 525/155 |
| 5,610,217 A | * | 3/1997 | Yarnell et al. | 524/397 |
| 5,770,654 A | * | 6/1998 | Blatz | 525/179 |
| 5,858,521 A | * | 1/1999 | Okuda et al. | 428/219 |
| 5,946,866 A | | 9/1999 | Weglewski et al. | |
| 6,124,406 A | * | 9/2000 | Cinadr et al. | 525/333.4 |
| 6,132,882 A | * | 10/2000 | Landin et al. | 428/437 |
| 7,176,269 B2 | | 2/2007 | Hakuta et al. | |

(Continued)

FOREIGN PATENT DOCUMENTS

EP    1 777 435 A1    4/2007

(Continued)

OTHER PUBLICATIONS

Jarvela et. al. J. Appl. Polym. Sci. 1997 65, 2003-2011.*

(Continued)

*Primary Examiner*—Vasu Jagannathan
*Assistant Examiner*—Mark S Kaucher
(74) *Attorney, Agent, or Firm*—P. N. Dunlap, Esq.; J. A. Thurnau, Esq.

(57) ABSTRACT

A torsional vibration damper or other vibration damping device with a rubber vibration absorbing element. The rubber element is a peroxide-cured composition based on 100 parts of ethylene-alpha-olefin elastomer, and 5 to 100 parts of polyvinyl butyral polymer which may have a molecular weight from about 40,000 to about 250,000. The composition may also include a compatibilizer or homogenizer, such as chlorinated polyethylene. The polyvinyl butyral increases the damping of the composition, and the compatibilizer improves the temperature stability of the damping.

20 Claims, 2 Drawing Sheets

U.S. PATENT DOCUMENTS

2001/0046595 A1* 11/2001 Moran et al. ............... 428/212
2004/0028860 A1* 2/2004 Dalal et al. ............... 428/36.91
2004/0076841 A1* 4/2004 Sauer et al. ............... 428/462

FOREIGN PATENT DOCUMENTS

KR   10-2006-0014570 A   2/2006

OTHER PUBLICATIONS

Reed, Industrial and Engineering Chemistry, 1943, 35, 4, 429-431.*
International Search Report and Written Opinion of the International Searching Authority; PCT/US2008/009035; Dec. 16, 2008.
Ma, et al., "Effects of compatibilizing agent and in situ fibril on the morphology, interface and mechanical properties of EPDM/nylon copolymer blends", Polymer, vol. 43 Issu 3, pp. 937-945 (Feb. 2002) (abstract only).
Liu, et al., "EPDM/polyamide TPV compatibilizer by chlorinated polyethylene", Polymer Testing, vol. 22, Issue 1, pp. 9-16 (Feb. 2003) (abstract only).
"Butvar Polyvinyl Butyral Resin Properties and Uses," Pub. No. 2008084D, Solutia Inc.
Maurice Morton, ed., "Rubber Technology," Van Nostrand Reinhold, NY (3d ed. 1987) pp. 260-263.

* cited by examiner

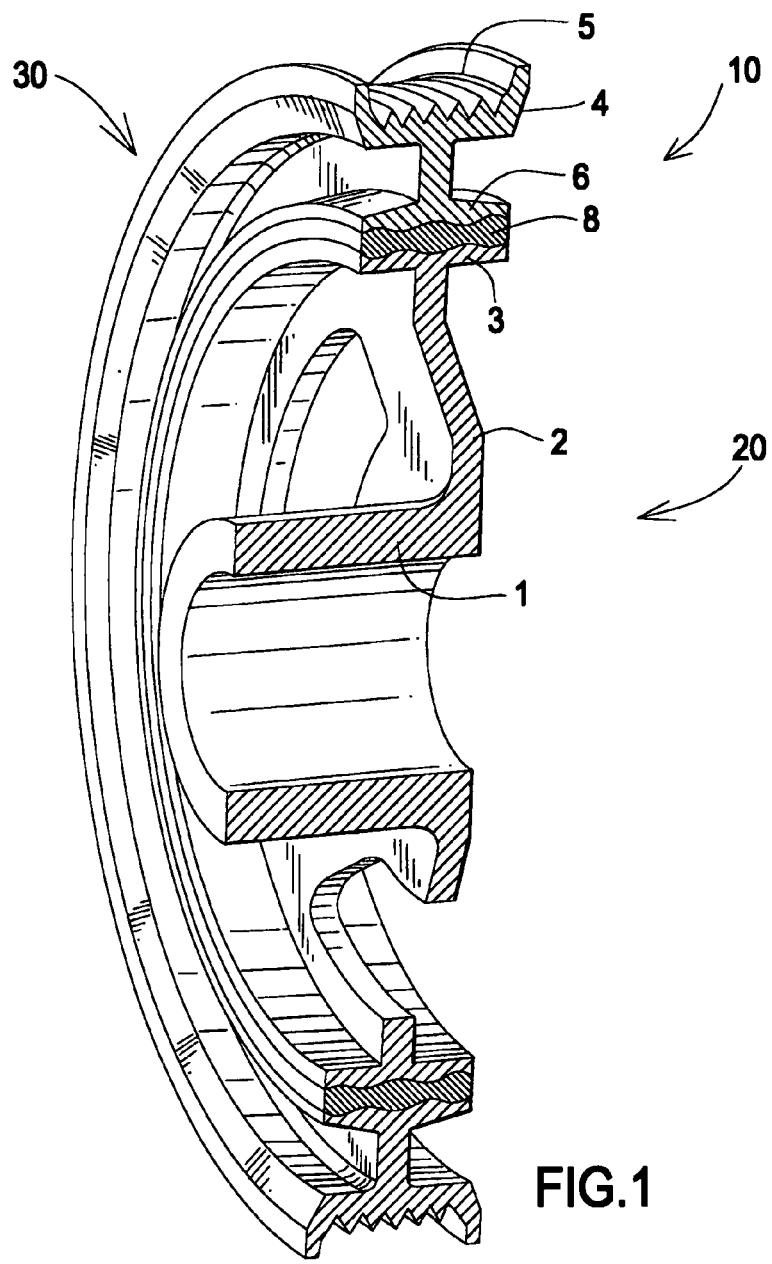
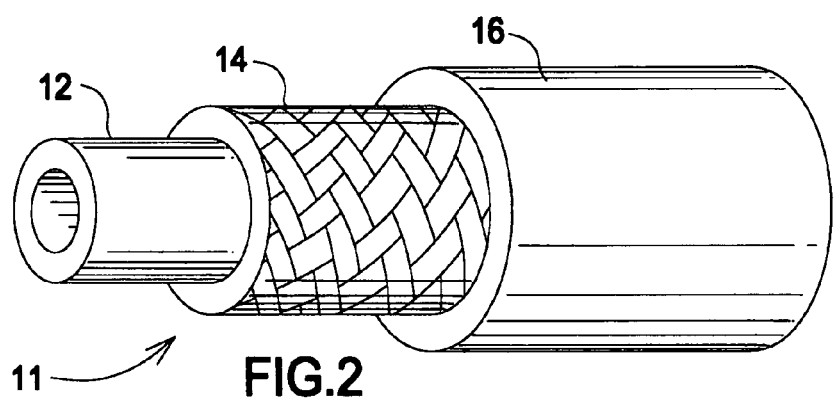

RUBBER COMPOSITION AND VIBRATION DAMPER USING THE RUBBER COMPOSITION

BACKGROUND OF THE INVENTION

This invention relates to an ethylene-alpha-olefin rubber composition with improved damping characteristics which can also be molded, bonded to metal, and used as the vibration absorbing element in torsional vibration dampers, engine mounts, or other such vibration control devices. This invention also relates to a crankshaft damper for absorbing torsional and bending vibrations utilizing the improved rubber composition as the vibration absorbing element.

Rubber compositions are in wide use in vibration control devices. Diene elastomers such as NR, BR, SBR, IIR, CR and NBR have traditionally been used because of their low cost. They are generally vulcanized by means of heat-activated cure systems comprising sulfur and sulfur-based cure accelerators. Rubber formulated with these elastomers is generally very limited in terms of heat resistance and ozone resistance. As performance demands have increased in many applications, such as the increase in under-hood temperatures in automotive applications, higher performance elastomers such as EPM, EPDM, HNBR, AEM, fluoro- and silicone rubbers have increased in use. EPM and EPDM, members of the ethylene-alpha-olefin family of elastomers, are desirable for vibration dampers because of their high heat resistance, ease of incorporating fillers, and relatively low cost. EPDM and EPM are also desirable because they can readily be cured with peroxide cure systems which are known to provide better compression set properties, better heat resistance, and better compatibility with certain metal-adhesive coagents than sulfur cure systems. Unfortunately for some vibration damping applications, ethylene-alpha-olefin elastomers tend to be very resilient, low-damping elastomers.

For vibration damping, the most important property of the rubber composition is the degree of damping. One way to characterize the damping of rubber is to measure the ratio of loss modulus to storage modulus, known as "tan $\delta$", by dynamic mechanical testing. Typical tan $\delta$ values for EPDM compositions are in the 0.05 to 0.1 range in the typical temperature range of operation from room temperature to about 100° C. What is needed in some vibration control devices is a peroxide-cured ethylene-alpha-olefin composition with improved, higher damping and tan $\delta$ values, e.g., around 0.2 or higher. An increase in damping of around 100% or more may be desired.

In the article "Low Modulus, High Damping, High Fatigue Life Elastomer Compounds for Vibration Isolation," *Rubber Chemistry & Technology*, 57(4) 792-803 (1984), authors M. A. Lemieux and P. C. Killgoar, Jr. describe their attempts to increase the damping of sulfur-cured NR compositions and NR/BR blend compositions for automotive suspension applications. Known methods of increasing damping include adding more filler, decreasing the amount of curative, changing the amount of plasticizer and changing or blending elastomers. Each of these known approaches has general limitations such as negative effects on other properties of the rubber or on the overall balance of properties of the rubber. Moreover, the particular utility, advantages and/or disadvantages of each approach are generally unpredictable without extensive experimentation.

After extensive evaluation of many compositions, ingredients and blends, the present invention unexpectedly meets the need for an ethylene-alpha-olefin rubber composition with increased damping for use in vibration dampers, in other vibration control devices, and in engineered rubber products subject to dynamic loading such as belts and hose. The improvement desired for vibration dampers is to at least increase the normal value of tan $\delta$ about 30% without degrading other desirable properties.

U.S. Pat. No. 6,386,065, which is incorporated herein by reference, discloses an example of a torsional vibration damper to which the subject invention could be applied. Additional examples of crankshaft dampers and examples of rubber compositions for vibration damping to which this invention could be applied are disclosed in U.S. Pat. No. 7,078,104, which is incorporated herein by reference. Reference is also made to U.S. Pat. No. 7,166,678 which discloses a different solution to the same problem.

BRIEF SUMMARY OF THE INVENTION

The present invention is directed to an ethylene-alpha-olefin rubber composition with sufficiently improved damping characteristics for use in torsional vibration dampers and other vibration absorbing devices.

The invention is also directed to a vibration absorbing device with a rubber vibration absorbing element. The rubber element has a composition based on 100 parts of an ethylene-alpha-olefin elastomer such as ethylene-propylene (EPM) or ethylene-propylene-diene rubber (EPDM) blended with polyvinylbutyral. The polyvinylbutyral may be present in an amount effective for substantially increasing the vibration damping character of the composition as indicated by at least a 30% increase in tan $\delta$ at a temperature in the range from 50 to 100° C., over a similar composition without PVB. The amount of PVB may be in the range from about 5 to about 100 parts per hundred parts of elastomer ("PHR").

The composition may also have a compatibilizer. The compatibilizer may be chlorinated polyethylene ("CPE"). The amount of compatibilizer may be in the range from about 1 to 50 phr. The compatibilizer may be present in an amount effective for broadening the temperature dependence of tan $\delta$ over the range from 50 to 100° C.

The invention is also directed to a belt, hose, or vibration control device comprising molded or extrusion-formed, ethylene-alpha-olefin rubber which includes a polyvinylbutyral component in an amount effective for substantially increasing the damping character of the rubber.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 1 is a cross section of a torsional vibration damper constructed according to the present invention;

FIG. 2 is a perspective view, with parts in section, of a hose constructed in accordance with the present invention;

DETAILED DESCRIPTION OF THE INVENTION

Figure 3:
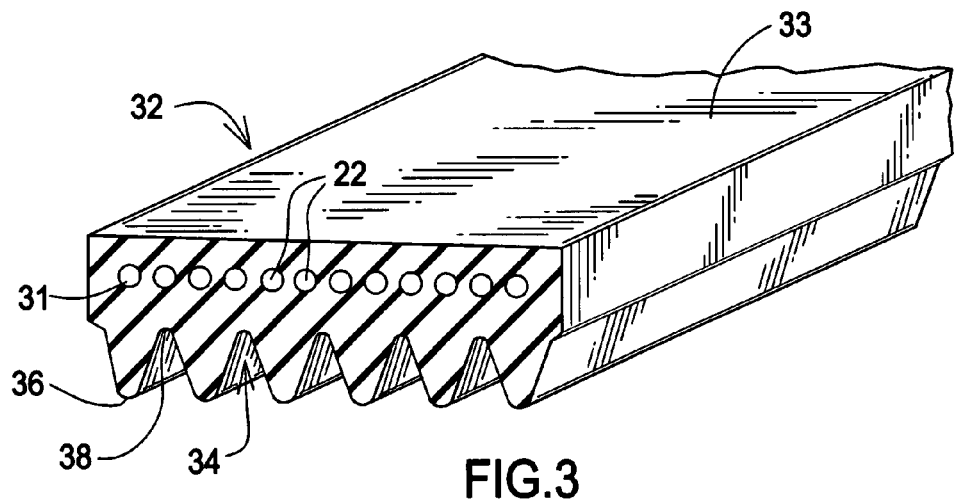
FIG. 3 is a perspective view, with parts in section, of a multi-V-ribbed belt constructed in accordance with the present invention.

Referring to FIG. 1, dual ring damper 10 comprises inner ring 20 and inertial outer ring 30 and sandwiched elastomeric ring 8.

Inner ring 20 comprises hub 1 and web 2 and rim 3. Hub 1 is sized to attach to a shaft (not shown, but conventional) such as a crankshaft. The configuration shown in FIG. 1 is for a press fit of hub 1 to a shaft, although a flange, or keyway, or other arrangement known in the art may also be used to secure the hub to a receiving shaft.

Inertial outer ring 30 comprises rim 6 and belt receiving portion 4. Belt receiving portion 4 may comprise any belt profile known in the art including the profile 5 for a multi-V-ribbed belt shown in FIG. 3.

Rims 3, 6 describe an annular space having a gap between them. Rims 3, 6 may be flat. Alternatively, rims 3, 6 may each have a complex shape that allows elastomeric ring 8 to be mechanically fixed in the annular space as show in FIG. 1. Rims 3, 6 may be coated with any of the rubber-to-metal adhesives known in the art to facilitate bonding of elastomeric ring 8 to the rim surfaces. Alternatively, elastomeric ring 8 may reside in the annular gap under compression relying on friction forces alone to prevent slippage between elastomeric ring 8 and rims 3, 6. Rims 3, 6 may comprise knobs, surface roughness, or any other form of random surface irregularity or friction producing form. An adhesive adjuvant in the elastomer formulation may be used to facilitate direct bonding of elastomer ring 8 to rims 3, 6. Dampers can also be assembled using various friction-enhancing substances on the rim surfaces or in the assembly lubricant. Alternatively, the rubber element can be molded directly to the metal part or parts of the damper, with or without prior coating of the metal with adhesive, or assembled under compression and directly bonded to the metal in a two-step cure process as disclosed in U.S. Pat. No. 7,078,104, the relevant parts of which are incorporated herein by reference.

Referring to FIG. 2, a hose 11 constructed according to one embodiment of the present invention is shown. The hose 11 comprises an elastomeric inner tube 12, a reinforcement member 14 telescoped over and preferably adhered to the inner tube 12, and an elastomeric outer cover 16 telescoped over and preferably adhered to the reinforcement member 14. The reinforcement member 14 is formed of a suitable reinforcement material which may include organic or inorganic fibers or brass-plated steel wires. The reinforcement material is preferably an organic fiber material, such as nylon, polyester, aramid, cotton or rayon. The reinforcement construction may be of any suitable type such as braid, spiral, knit or wrapped, but in the embodiment shown, is of a braid construction.

The inner tube 12 may consist of multiple elastomeric or plastic layers which may or may not be of the same composition. The elastomeric outer cover 16 is made of suitable materials designed to withstand the exterior environment encountered. The inner tube 12 and the outer cover 16 may be made of the same material. The hose 11 may be formed by molding or extrusion. At least one elastomeric layer of either the inner tube 12 or outer cover 16 may be made more damping according to the present invention, thus improving a vibration damping characteristic of the hose.

Referring to FIG. 3, multi-V-ribbed belt 32 constructed according to one embodiment of the present invention is illustrated. Belt 32 includes main elastomeric belt body portion 33 and also includes tensile reinforcement member 31 preferably in the form of cords 22. A plurality of raised areas or apexes 36 alternating with a plurality of trough areas 38 define there between oppositely facing sides 34 which serve as the driving surfaces of belt 32 when in contact with belt receiving portion 4 of outer ring 30 described above or with any similarly mating belt pulley. Main belt body portion 33 may be formed from a rubber composition according to the present invention as described in greater detail below. Other belt styles known in the art, such as synchronous belts or V-belts, may also have a main belt body portion formed from a rubber composition that may be improved according to the present invention as described below. Belt body 33 may comprise various layers comprising different rubber compositions, such as a surface layer, an undercord or rib layer, a cord adhesion layer, and/or an overcord layer, any of which may also have a fibrous reinforcement component. Thus, the inventive rubber composition may be incorporated in one or more distinct layers of belt body 33 as an internal vibration control device to improve a vibration characteristic of a belt or belt drive system.

The description below will focus on elastomer ring 8, but one skilled in the art will recognize that the details also apply to an elastomeric layer of hose 11 or main belt body 33 or the rubber elements of other vibration control devices. Within the present context, the terms, "elastomer" and "rubber" will be utilized interchangeably to denote any natural or synthetic high polymer having the properties of deformation and elastic recovery upon curing or vulcanization; and the terms "curative", "curing agent", "cross-linking agent" or "vulcanization agent" will be utilized interchangeably to denote a substance that is capable of converting an elastomer from thermoplastic to thermosetting, i.e., that is capable of cross-linking the elastomer molecules. In the present context, the terms, "rubber-to-metal adhesive adjuvant" (or "adjuvant") and "rubber-to-metal adhesive coagent" (or "coagent") are used interchangeably to denote a material that provides, promotes or contributes to adhesion between itself and one or more other materials, or between two or more such materials, through mechanical- and/or chemical bonding, the latter of which may include any type, including but not limited to covalent bonding, ionic bonding, dipole interactions such as hydrogen bonding, etc.

The elastomer composition in accordance with an embodiment of the present invention comprises at least one ethylene-alpha-olefin elastomer and includes polyvinylbutyral ("PVB"). PVB increases the damping of the composition as well as improving other properties. PVB is a thermoplastic polymer or resin obtained by the reaction of polyvinyl alcohol with butyraldehyde. PVB is a vinyl-ester polymer of the polyvinylacetal family. Suitable grades of PVB include, for example, B-90 and B-98, sold under the trademark BUTVAR by Solutia, Inc. B-90 and B-98 have different molecular weights. Table 1 shows the basic properties of these two grades. The butyral content need not be 100%, but may be in the range from about 50 to about 90%, or from about 80% to about 88%. The acetate content expressed as percent vinyl acetate may be less than about 2.5%. The hydroxyl content expressed as percent polyvinyl alcohol may be up to about 20%, or in the range from about 10% to about 20%, or from about 18% to about 20%.

TABLE 1

| Properties | Units | B-90 | B-98 |
|---|---|---|---|
| Molecular weight (weight average) | ×1000 | 70-100 | 40-70 |
| Hydroxyl content | % | 18-20 | 18-20 |
| Acetate content | % | 0-1.5 | 0-2.5 |
| Butyral content | % | 80 | 80 |
| Tensile stress at break | $10^3$ psi | 5.7-6.7 | 5.6-6.6 |
| Elongation at break | % | 100 | 110 |
| Modulus of elasticity | $10^5$ psi | 3.0-3.1 | 3.1-3.2 |
| Glass transition temperature | °C. | 72-78 | 72-78 |

In the conventional practice of formulating rubber, an elastomeric composition may be developed that performs adequately in most respects, but is deficient in damping character. Typically such a composition will include some process oil, plasticizer or other softener. It has been found in accordance with an embodiment of the present invention that by adding some PVB the damping of the elastomer composition can be significantly increased. It has been found that adding about 10 to about 30 phr of PVB may be sufficient to give the desired damping level. As will be seen in the examples to follow, 30 phr of PVB in the MW range of about 40,000 to about 120,000 is sufficient to approximately double the value of tan δ for an EPDM rubber composition. It is believed that amounts from about 5 phr to about 100 phr of PVB may be advantageously used to increase the damping of an elastomer composition. If less than about 5 phr of PVB is incorporated in the EPDM rubber, not much increase in damping will result. It is anticipated that use of much more than 100 phr PVB may degrade physical properties of the rubber composition. It is also anticipated that below a MW of about 20,000, PVB might function like many a process oil or softener, softening the rubber without increasing the damping. It is also anticipated that up to a molecular weight of about 250,000 or more the PVB would provide the desired increase in damping. However, above a MW of about 120,000, it is expected that processing of the elastomer composition may become difficult due to the high viscosity of the PVB. At higher MW, the PVB may also stiffen the composition, although a plasticizer could be advantageously used to overcome any stiffening effect.

The inventive elastomer composition may also advantageously include a compatibilizer or homogenizing agent. PVB is believed to be incompatible with EPDM, forming a separate dispersed phase within the EPDM matrix. This is because PVB is relatively polar and EPDM is relatively non-polar. A tan δ versus temperature sweep on a DMA test, for example in torsion mode at 10 Hz and 0.5% strain shows two distinct peaks, one at the Tg (glass transition temperature) of each component, i.e., a peak at about −50° C. for EPDM and one at about 70° C. for PVB. Such an incompatible blend may be useful in damping rubber compositions for some applications. At use temperatures near the Tg of the PVB additive, the damping is particularly increased. However, the presence of the PVB Tg peak makes the damping inherently strongly dependent on temperature. For many applications, it may be advantageous to reduce the variation of tan δ with temperature. It has been discovered that including a blend compatibilizer may broaden the tan δ peak associated with the PVB component, thus reducing the variation of tan δ with temperature. Reduced variation of damping with temperature is generally a desirable performance feature for vibration damping devices.

A compatibilizer generally is a molecule having both polar and non-polar moieties. Suitable compatibilizers may include various naturally occurring or synthetic hydrocarbon resins and blends or mixtures thereof. Compatibilizers may include aliphatic, naphthenic, and/or aromatic resins and blends or mixtures thereof. Compatibilizers may include phenolic resins, maleic anhydride modified EPDM, and the like. An example of a particularly suitable compatibilizer is chlorinated polyethylene ("CPE"). One example of a suitable grade of CPE is CM3611P sold under the trademark TYRIN by The Dow Chemical Company. CPE may be included in the elastomer composition at levels up to about 50 phr, or at least about 1 phr, or from about 3 to about 20 phr.

The elastomer ring 8 according to the present invention may optionally include any of the fillers, softeners, antioxidants, coagents and curatives known in the art. Lists of ingredients and their common uses are readily available in the art. See e.g. Robert F. Ohm, ed., "The Vanderbilt Rubber Handbook," R.T. Vanderbilt Co., Inc., CT, ($13^{th}$ ed. 1990); Maurice Horton, ed., "Rubber Technology," Van Nostrand Reinhold, N.Y., ($3^{rd}$ ed. 1987); Th. Kempermann, S. Koch, & J. Sumner, eds. "Manual for the Rubber Industry," Bayer AG, ($2^{nd}$ ed. 1993). Suitable ethylene-alpha-olefin elastomers include copolymers of ethylene and propylene, pentene, octene, or butene. Suitable ethylene-alpha-olefin elastomers include terpolymers composed of ethylene, an alpha-olefin, and an unsaturated component such as 1,4-hexadiene, dicyclopentadiene, or ethylidenenorbornene (ENB). In one embodiment of the present invention, the primary elastomer is EPDM with ENB as the unsaturated component.

The free-radical-producing curatives useful in the present invention are those suitable for curing ethylene-alpha-olefin elastomers and include for example, organic peroxides and ionizing radiation. Exemplary organic peroxide curatives include, but are not limited to, 1,1-di-(t-butylperoxy)-3,3,5-trimethylcyclohexane, 2,5-dimethyl-2,5-di-(t-butylperoxy) 3-hexyne, dicumyl peroxide, bis-(t-butylperoxy-diisopropyl benzene), α-α-bis(t-butylperoxy)diisopropyl benzene, di-t-butyl peroxide, 2,5-dimethyl-2,5-di-t-butylperoxyhexane, and t-butyl perbenzoate. Peroxides are conventionally incorporated at about 2 to 10 parts weight per hundred of rubber (phr). Sulfur may optionally be added to the peroxide as part of the cure system at about 0.1 to 1 phr. Herein and in the claims, the term "parts" is defined as parts by weight.

The rubber composition may have an adhesion promoter for promoting bonding of the rubber to metal members or reinforcing textile members, depending on the needs of the application. Suitable adhesion promoters or adjuvants include those materials generally classified as Type I coagent compounds, exemplified by polar, relatively low molecular weight materials such as acrylates, methacrylates and certain bismaleimides; and those materials generally classified as Type II coagent compounds, exemplified by the low polarity, network-building maleated polybutadienes. Further examples, characteristics and suitable usage amounts of Type I and Type II coagents are described in the paper, "1,2 Polybutadiene Coagents for Improved Elastomer Properties" by R. E. Drake et al., Ricon Resins, Inc., as presented at the American Chemical Society Rubber Division Meeting in November 1992. Type I and Type II coagents are furthermore disclosed in U.S. Pat. No. 5,300,569 to Drake et al., and as polyfunctional monomers in U.S. Pat. No. 4,857,571, the disclosures of which with respect to exemplary coagents and their relative useful amounts in elastomer compositions are hereby specifically incorporated by reference.

In combination with the ethylene-alpha-olefin elastomers utilized in exemplary embodiments of the present invention, such Type II adjuvants include for example maleated polybutadienes, such as maleinized 1,2-polybutadiene resins (70-90%) exemplified by the material available under the trademark RICOBOND 1756 by Sartomer Co., Inc.; and the Type I metal salts of alpha-beta unsaturated organic acids set forth for example in U.S. Pat. No. 5,610,217 to Yarnell et al., the contents of which with regard to such salts and their beneficial use in such elastomer systems is herein specifically incorporated by reference. Such salts include zinc diacrylate and zinc dimethacrylate including those available under the trademarks SARET 633, SARET 634, and SARET 708 by Sartomer Co., Inc. In particular, zinc dimethacrylate may beneficially be utilized in amounts of from about 1 to about 50 parts per hundred weight of elastomer ("phr"), more preferably of from about 10 to about 40 phr, and most preferably of from about 15 to about 30 phr. Maleated polybutadiene resins when used may be favorably incorporated in the elastomer compositions in the same to slightly lower amounts, e.g., of from about 1 to 50 phr; more preferably of from about 5 to 40 phr; and most preferably of from about 10 to 30 phr. Additionally, imide coagents such as that exemplified by N,N'-m-phenylenedimaleimide available under the trademark HVA-2 by DuPont Chemical Co. may be used singly in about the same foregoing amounts, or may optionally but favorably be used in combination with one or more of the above-described adjuvants/coagents, in amounts of from about 0.25 to about 5 phr; more preferably of from about 0.50 to about 2.5 phr; and most preferably of from about 0.75 to about 1.50 phr.

Other properties of the rubber composition can be balanced or adjusted as needed by known methods of rubber formulation without departing from the disclosure of the present invention. It is believed that the invention may be suitably practiced with sulfur-cured EPDM including with known suitable adhesion promoter systems for sulfur-cure systems.

Other ingredients known to those skilled in the art may be used in conventional amounts for various purposes in the elastomer composition. Coagents such as triallylisocyanurate, triallylcyanurate, zinc dimethacrylate or other metal salts of alpha-beta unsaturated organic acids, N,N'-m-phenylenedimaleimide, and trimethylolpropanetrimethacrylate or other acrylates and methacrylates, may be added to enhance certain properties and/or for adhesion to metal or other materials. Carbon black, silica or other fillers may used to reinforce or dilute the elastomer. Antioxidants, antiozonants, colorants, plasticizers, process oils, and/or process aids may be used as needed.

The torsional vibration damper of FIG. 1 is representative of vibration control devices that can be improved by incorporation of an elastomer composition based on EPDM with improved damping characteristics. Other devices comprising rubber that may be improved by increasing the damping of the rubber according to this invention include engine mounts, bushings, shaft dampers, hose, and belts. Engine mounts, bushings, and shaft dampers typically comprise metal structural members and rubber vibration absorbing elements as exemplified by the damper of FIG. 1. The hose of FIG. 2 and the belt of FIG. 3 are representative of other products comprising rubber which may be improved by increasing the damping of the rubber according to this invention. Hoses and belts typically comprise textile reinforcing members and one or more layers of rubber. Increased damping in hoses and belts may be desired either to reduce span vibration in the hose or belt, or to reduce the transmission of vibrations from one connection or contact point to another in a fluid or power transmission system.

The following examples are submitted for the purpose of illustrating the nature of the invention and are not intended as a limitation on the scope thereof.

EXAMPLES

Rubber compositions were prepared by conventional rubber mixing methods. Rubber batches were sized to fill the internal mixing chamber of a BR Banbury® (registered trademark of Farrel Corporation) mixer to about 75 percent of capacity. The mixer was run at about 70 rpm with cooling water on. The EPDM and the PVB were first placed into the mixing chamber for about 1 minute of blending. Then all additional ingredients except for the peroxide curatives were added. The ram was raised for sweeping after about 3, 5 and 6.5 minutes of mixing. The mix was dumped after about 8 minutes of mixing. The mass was cooled on a two-roll mill and the peroxide curatives were then added on the mill. A sample of each composition was tested using a Rubber Process Analyzer (RPA) manufactured by Alpha Technologies. The RPA was programmed to cure the rubber composition followed by a series of tan δ measurements at several temperatures, several frequencies, and at 7 percent strain. Tensile properties, including tensile strength and elongation at break, were determined for some examples using the methods of ASTM D412 at room temperature. Tear strength was determined for some examples using the method of ASTM D624, die C at room temperature. Compression set was determined for some examples according to ASTM D395, test method B after 22 hours at 150° C. Damping stability was evaluated for some samples by dynamic mechanical analysis ("DMA"), i.e., measuring tan δ versus temperature in torsion mode over a range of from −100° C. to 150° C. at 10 Hz and 0.5% strain. Lap shear adhesion results provided in the following tables were obtained using steel tabs each measuring 1 inch by 2.5 inches, and molded rubber slabs measuring 3/16 of an inch in thickness by 1 inch square, assembled according to the method of ASTM D816 such that the rubber sample was substantially fully covered on both relevant surfaces by the steel tab, under an applied force sufficient to achieve about 30% rubber compressive strain. The molded rubber slabs were vulcanized or cured to about 80% of full cure in a first cure step. The lap shear specimens were then assembled and the rubber substantially fully cured in contact with the steel and under the stated compressive strain or compression, according to the two-step cure method described in U.S. Pat. No. 7,078,104.

The compositions for all the examples are shown in Table 2 and Table 3. Comparative Example 1 ("Comp. Ex. 2") is a typical EPDM rubber formulation useful for direct bonding to metal parts and for vibration damping. Comp. Ex. 1 is the same as Comp. Ex. 2, but without the metal adhesion promoter. Embodiments of the invention are referred to as Examples ("Ex.").

Table 4 shows test results for a number of examples and Comp. Ex. 1. The damping results shown in Table 4 illustrate the increase in damping that can be obtained by the addition of PVB to an EPDM rubber composition. The damping level, indicated by tan δ of about 0.2, exhibited by Comp. Ex. 1 is not as high as desired for many applications. Examples 3 through 8 exhibit damping levels that are about twice as high as Comp. Ex. 1, i.e., up to about a 100% increase in damping is exhibited by the examples.

The tensile test, tear test, and compression set test results for the examples in Table 4 show that these other properties are generally maintained at acceptable levels, with occasional minor improvements, by the addition of PVB to an EPDM rubber composition. Thus, in addition to improved damping, PVB can maintain or possibly improve other properties as well.

The lap shear adhesion to steel data in Table 4 illustrate another unpredictable result. PVB is known for use as a laminating adhesive, for example in automotive windshields. Thus, in choosing the compositions for Ex. 3-8, the adhesive coagent, Saret 634, was intentionally omitted, in expectation that the PVB would function as an adhesive adjuvant. However, as the lap shear results show, the Ex. 3-8 exhibit very poor adhesion compared to the Table 5 examples which contain adhesion promoter, and only slightly better adhesion results than for Comp. Ex. 1. Thus, the effect on adhesion of adding PVB was unpredictable and even contrary to expectations.

The results for Ex. 9 and Ex. 10 shown in Table 5 show that including an adhesion promoter or coagent in the rubber composition along with PVB can provide both excellent rubber-to-metal bonding and improved damping. Ex. 9 includes Saret 634, zinc dimethacrylate sold under the SARET trademark by Sartomer Company, Inc. Ex. 10 includes Ricobond 1756HS, a polybutadiene resin sold under the RICOBOND trademark by Sartomer.

Figure 4:
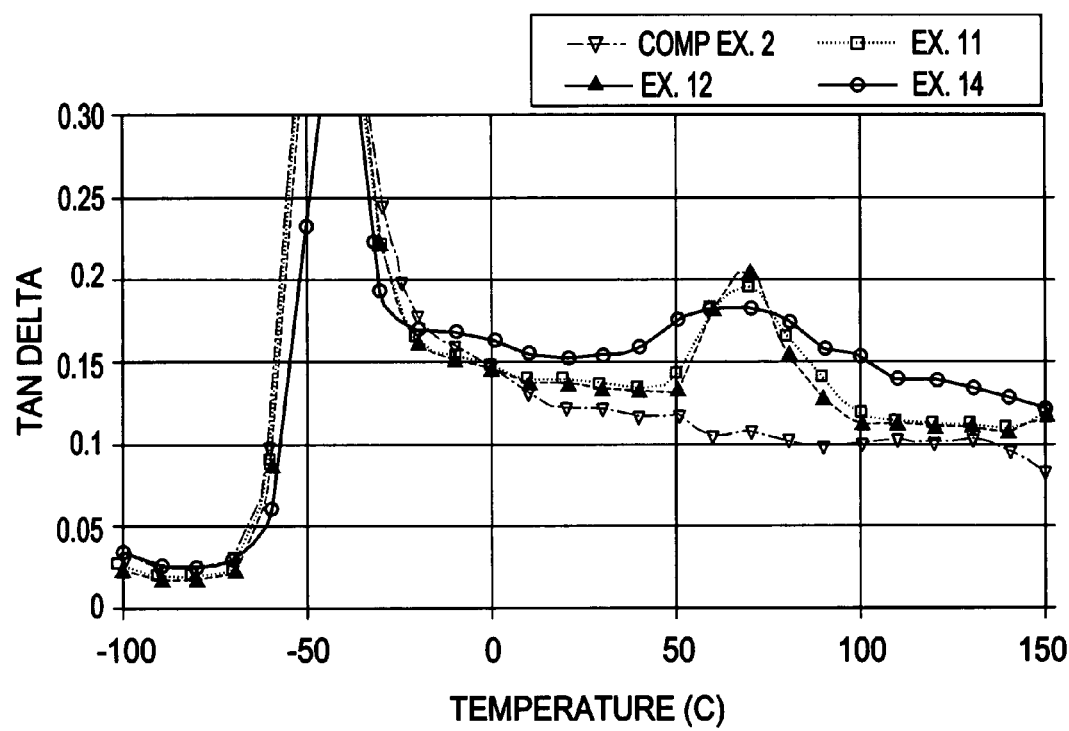
FIG. 4 is a graph of tan δ, measured by DMA over a broad temperature range illustrating a damping characteristic of EPDM rubber compositions according to the present invention.

Table 5 furthermore shows the improvement in tan δ possible by including a homogenizing agent or compatibilizer in the rubber composition. Examples 11 through 13 include various homogenizers marketed for plastics and rubber under the trademark STRUKTOL by Struktol Company of America, and Ex. 14 includes CPE as a compatibilizer. While damping improvements at a single temperature and multiple frequencies are shown in Table 5, the three STRUKTOL homogenizers exhibited very little effect on the damping stability or breadth of the tan δ peak at about 70° C. and extending over a temperature range of from 50 to 100° C. in a DMA temperature sweep. DMA temperature sweep results of the tan δ measurements for examples 11, 12, and 14 and for the Comp. Ex. 2 are shown in FIG. 4. Ex. 14 includes 8 PHR of CPE. The use of CPE as a compatibilizer is found to broaden the tan δ peak over a temperature range of from 50 to 100° C. and thus improve the damping temperature stability of the composition. It may be noted that CPE is not generally recognized as a polymer blend compatibilizer, yet CPE surprisingly provided more damping stability than materials marketed as homogenizers.

TABLE 2

| Compound Ingredients (PHR) | Supplier | Comp. Ex. 1, 2 | Ex. 3, 4, 5 | Ex. 6, 7, 8 | Ex. 9 | Ex. 10 |
|---|---|---|---|---|---|---|
| Royalene 4697[1] | Chemtura | 200 | 200 | 200 | 200 | 200 |
| Zinc Oxide | Many | 5 | 5 | 5 | 5 | 5 |
| Zinc Stearate | Many | 1.5 | 1.5 | 1.5 | 1.5 | 1.5 |
| Triethanolamine 99% | Many | 1 | 1 | 1 | 1 | 1 |
| AO[2] | Many | 1.5 | 1.5 | 1.5 | 1.5 | 1.5 |
| N293 Carbon Black | Cabot | 50 | 50 | 50 | 50 | 50 |
| N550 Carbon Black | Many | 90 | 90 | 90 | 90 | 90 |
| Sunpar 2280 Paraffin Oil | Sun Refining | 5.9 | 5.9 | 5.9 | 5.9 | 5.9 |
| Saret 634[3] | Sartomer | 0, 20 | 0 | 0 | 20 | 0 |
| Ricobond 1756HS | Sartomer | 0 | 0 | 0 | 0 | 20 |
| HVA-2[4] | DuPont Performance Elastomers | 1 | 1 | 1 | 1 | 1 |
| PVB Butvar B-98 | Solutia | 0 | 10, 20, 30 | 0 | 20 | 20 |
| PVB Butvar B-90 | Solutia | 0 | 0 | 10, 20, 30 | 0 | 0 |
| Varox 231XL[5] | R.T. Vanderbilt | 5.4 | 5.4 | 5.4 | 5.4 | 5.4 |
| Varox 130XL[6] | R.T. Vanderbilt | 1 | 1 | 1 | 1 | 1 |

[1]EPDM extended with 100 phr of a white, hydrotreated paraffinic oil.
[2]2,2,4-trimethyl-1,2-dihydroquinoline, polymerized.
[3]Zinc dimethacrylate.
[4]N,N'-m-phenylenedimaleimide.
[5]2,5-dimethyl-2,5-Di-(t-butylperoxy) 3-hexyne.
[6]1,1-Di-(t-butylperoxy)-3,3,5-trimethylcyclohexane.

TABLE 3

| Compound Ingredients (PHR) | Supplier | Ex. 11 | Ex. 12 | Ex. 13 | Ex. 14 |
|---|---|---|---|---|---|
| Ex. 9 | See Table 2 | 402.3 | 402.3 | 402.3 | 402.3 |
| Struktol 40MS flakes[1] | Struktol Co. | 8 | 0 | 0 | 0 |
| Struktol TR 060[2] | " | 0 | 8 | 0 | 0 |
| Struktol TR 065[3] | " | 0 | 0 | 8 | 0 |
| Tyrin CM3611P[4] | Dow Chemical | 0 | 0 | 0 | 8 |

[1]Proprietary mixture of aliphatic, naphthenic, and aromatic resins.
[2]Proprietary mixture of light-colored aliphatic resins with molecular weight below 2000.
[3]Proprietary blend of medium molecular weight resins.
[4]Chlorinated polyethylene with 36% chlorine and ML1 + 4@121° C. of 30.

TABLE 4

| Test | Comp. Ex. 1 | Ex. 3 | Ex. 4 | Ex. 5 | Ex. 6 | Ex. 7 | Ex. 8 |
|---|---|---|---|---|---|---|---|
| Tensile Strength (psi) | 2145 | 1668 | 1520 | 1457 | 1730 | 1613 | 1084 |
| Elongation at Break (%) | 537 | 634 | 463 | 485 | 580 | 524 | 301 |
| Tear Strength (lbs per inch) | 214 | 225 | 221 | 239 | 239 | 223 | 235 |
| Compression Set (%) | 34 | 49 | 39 | 35 | 36 | 34 | 41 |
| Damping: tan δ at 3 Hz[1] | 0.21 | 0.34 | 0.38 | 0.41 | 0.33 | 0.37 | 0.41 |
| Damping: tan δ at 17 Hz[1] | 0.24 | 0.36 | 0.41 | 0.43 | 0.37 | 0.38 | 0.44 |
| Damping: tan δ at 33 Hz[1] | 0.23 | 0.36 | 0.41 | 0.45 | 0.37 | 0.41 | 0.44 |
| Lap Shear adhesion to steel (lbs) | 24 | 60 | 75 | 75 | 40 | 80 | 80 |

[1]RPA test at 66° C., 7% strain.

TABLE 5

| Test | Comp. Ex. 2 | Ex. 9 | Ex. 10 | Ex. 11 | Ex. 12 | Ex. 13 | Ex. 14 |
|---|---|---|---|---|---|---|---|
| Tensile Strength (psi) | 2040 | 1667 | 1278 | 1568 | 1660 | 1542 | 1646 |
| Elongation at Break (%) | 399 | 403 | 317 | 423 | 471 | 431 | 539 |
| Tear Strength (lbs per inch) | 193 | 227 | 181 | 227 | 252 | 238 | 237 |
| Compression Set (%) | 45 | 50 | 39 | 49 | 54 | 55 | 55 |
| Damping: tan δ at 3 Hz[1] | 0.16 | 0.205 | 0.22 | 0.24 | 0.28 | 0.29 | 0.31 |
| Damping: tan δ at 17 Hz[1] | 0.18 | 0.24 | 0.26 | 0.27 | 0.32 | 0.34 | 0.33 |
| Damping: tan δ at 33 Hz[1] | 0.19 | 0.23 | 0.255 | 0.26 | 0.31 | 0.32 | 0.34 |
| Lap Shear adhesion to steel (lbs) | 320 | 295 | 260 | 261 | 326 | 323 | 340 |

[1]RPA test at 66° C., 7% strain.

To illustrate the performance improvement that can be obtained in a vibration control device, a composition of the present invention was incorporated as the rubber element in a torsional vibration damper. The compositions of Comp. Ex. 2 and Ex. 14 were used and the two-step cure method described in U.S. Pat. No. 7,078,104 was used. The results of a damping measurement measured in a shaker test 100-500 Hz freq sweep, 60 seconds, forced vibration with damping measured when temperature reaches 66° C., 0.2° double amplitude excitation, averaging results on five dampers, are shown in Table 6. The Ex. 14 composition gives significantly better damping than the Comp. Ex. The dampers were also subjected to a torque-to-turn ("TTT") test to determine the strength of adhesion, and those results are also shown in Table 6. The inventive composition shows higher TTT than the comparative example, and this is believed to be at least partially a result of the higher tear strength properties and excellent adhesion of the inventive composition.

TABLE 6

| damper tests (average of 5) | Comp. Ex. 2 | Ex. 14 |
|---|---|---|
| Damping[1] (%) | 18.6 | 24.4 |
| TTT (ft-lbs) | 3250 | 4300 |

[1]Shaker test at 66° C., 0.2° strain.

Thus, the present invention provides an ethylene-alpha-olefin rubber composition with sufficiently improved damping characteristics for use in torsional vibration dampers and other vibration absorbing devices. The composition provided may be cured by free-radical-promoting cure systems. The present invention may be useful in belts or hose or other applications where increased damping is desired. The present invention also provides a torsional vibration damper with improved damping.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A vibration absorbing device comprising a rubber vibration absorbing element comprising a vulcanized rubber composition comprising: ethylene-alpha-olefin elastomer and polyvinyl butyral and chlorinated polyethylene as a compatibilizer; wherein said composition comprises 100 parts by weight of said elastomer, from 1 to 50 parts of said chlorinated polyethylene, and from 5 to 100 parts of said polyvinyl butyral.

2. The device of claim 1 wherein said composition comprises 100 parts by weight of said elastomer and from 5 to 30 parts of said polyvinyl butyral.

3. The device of claim 1 wherein said composition comprises 100 parts by weight of said elastomer, from 1 to 20 parts of said chlorinated polyethylene, and from 5 to 30 parts of said polyvinyl butyral.

4. The device of claim 1 wherein said polyvinyl butyral is present in said composition in an amount effective to increase tan δ of said element by at least 30% at a temperature in the range of from 50 to 100° C. and at a suitable frequency, relative to a similar element without polyvinyl butyral.

5. The device of claim 1 wherein said compatibilizer is present in said composition in an amount effective to broaden the temperature dependence of tan δ of said element over a temperature range of from 50 to 100° C. and at a suitable frequency, relative to a similar element without said compatibilizer.

6. The device of claim 1 further comprising a rubber-to-metal adhesion promoter.

7. The device of claim 6 wherein said promoter is one or more selected from the group consisting of metal salts of unsaturated organic acids and maleated polybutadiene resins.

8. The device of claim 1 wherein said device is selected from the group consisting of a torsional vibration damper, a vibration isolator, a belt, a hose, and a rubber element of one of the foregoing.

9. The device of claim 1 wherein said rubber element is cured by a free-radical-producing means.

10. The device of claim 9 wherein said free-radical-producing means is selected from the group consisting of organic peroxides and ionizing radiation.

11. The device of claim 1 wherein said elastomer is selected from the group consisting of ethylene-propylene copolymers, ethylene-propylene-diene terpolymers, ethylene-octene copolymers, ethylene-octene-diene terpolymers, ethylene-butene copolymers, ethylene-butene-diene terpolymers, and blends thereof.

12. The device of claim 1 wherein said polyvinyl butyral has a weight average molecular weight in the range from about 40,000 to about 250,000.

13. A rubber composition comprising: 100 parts of ethylene-alpha-olefin elastomer; 5 to 100 parts of polyvinyl butyral; and 1 to 50 parts of chlorinated polyethylene.

14. The composition of claim 13 wherein said polyvinyl butyral has a weight average molecular weight in the range from about 40,000 to about 250,000.

15. The composition of claim 14 further comprising a rubber-to-metal adhesion promoter, wherein said composition is peroxide cured.

16. The composition of claim 15 wherein said promoter is one or more selected from the group consisting of metal salts of unsaturated organic acids and maleated polybutadiene resins.

17. The composition of claim 15 wherein said elastomer is selected from the group consisting of ethylene-propylene copolymers, ethylene-propylene-diene terpolymers, ethylene-octene copolymers, ethylene-octene-diene terpolymers, ethylene-butene copolymers, ethylene-butene-diene terpolymers, and blends thereof.

18. The composition of claim 13 comprising from 5 to 30 parts of said polyvinyl butyral and from 1 to 20 parts of said chlorinated polyethylene.

19. The composition of claim 13 wherein said polyvinyl butyral is present in an amount effective to increase tan δ of said element by at least 30% at a temperature in the range of from 50 to 100° C. and at a suitable frequency, relative to a similar element without polyvinyl butyral.

20. The composition of claim 13 wherein said chlorinated polyethylene is present in an amount effective to broaden the temperature dependence of tan δ of said element over a temperature range of from 50 to 100° C. and at a suitable frequency, relative to a similar element without said chlorinated polyethylene.

* * * * *